Mar. 20, 1923. 1,449,224.
G. H. GREIMAN.
CLEANING SCRAPER FOR EXCAVATORS.
FILED DEC. 1, 1921.
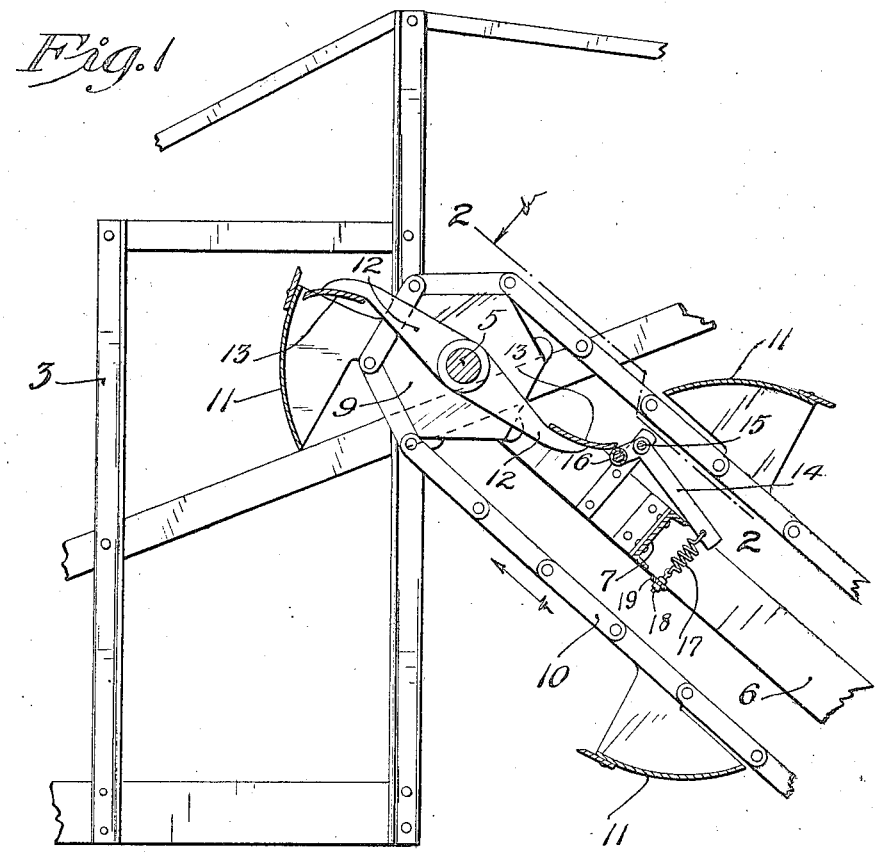
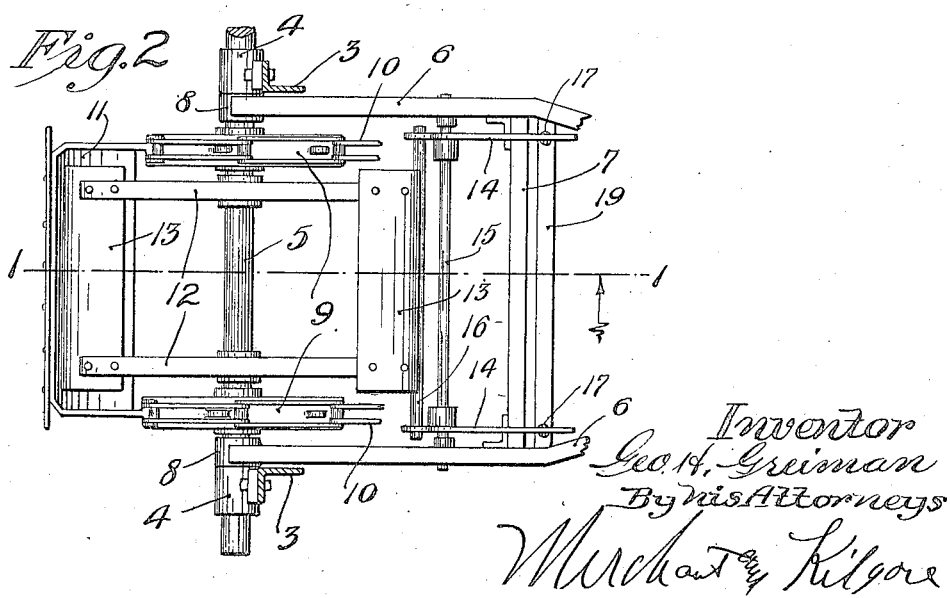
Inventor
Geo. H. Greiman
By his Attorneys
Merchant & Kilgore Patented Mar. 20, 1923.

1,449,224

UNITED STATES PATENT OFFICE.

GEORGE H. GREIMAN, OF GARNER, IOWA.

CLEANING SCRAPER FOR EXCAVATORS.

Application filed December 1, 1921. Serial No. 519,106.

*To all whom it may concern:*

Be it known that I, GEORGE H. GREIMAN, a citizen of the United States, residing at Garner, in the county of Hancock and State of Iowa, have invented certain new and useful Improvements in Cleaning Scrapers for Excavators; and I do hereby declare the following to be a full, clear, and exact description of the invention, such as will enable others skilled in the art to which it appertains to make and use the same.

My present invention provides an improved cleaning device or scraper for excavators of the power-driven type wherein excavating devices, variously indicated as shovels, buckets, spades or scoops, are employed, and, generally stated, the invention consists of the novel construction, arrangement and combinations of parts hereinafter described and defined in the claims.

From a broad point of view, the present invention is in the nature of a modification of the scraper disclosed and broadly claimed in my pending application Serial Number 514,946, filed of date November 14, 1921, entitled "Cleaning device for excavators." More especially, the present invention is directed to the provision of an improved cleaning device or scraper for use in connection with excavators wherein the buckets or spades are carried by parallel link belts or chains. In this improved arrangement, the rotatable cleaning device or scraper is pivotally mounted on one of the sprocket-equipped elevator shafts and is arranged to rotate about the same between the bucket-carrying chains whenever it is overcome or forced from its operative position by a rock or other unyielding material caught between a bucket and the cleaning blade.

In the accompanying drawings, which illustrate the invention, like characters indicate like parts throughout the several views.

Referring to the drawings:

Fig. 1 is a fragmentary view party in elevation but with some parts sectioned on the line 1—1 of Fig. 2; and Fig. 2 is a plan view with some parts in horizontal section on the line 2—2 of Fig. 1.

The numeral 3 indicates the frame structure of the excavator, to the rear portion of which are secured aligned shaft bearings 4 in which a power-driven shaft 5 is journaled.

The vertically oscillatory excavator boom, as shown, is made up of laterally spaced beams 6 rigidly tightened together by cross bars 7. These beams 6, at their upper ends, are provided with bearings 8 that are pivoted on the shaft 5 or otherwise arranged to move concentrically around the axis thereof.

Between the beams 6, the shaft 5 is provided with laterally spaced sprocket wheels 9, which, as shown, are of polygonal form. The excavator belts 10, in the form of link or sprocket chains, are arranged to run over the sprockets 9 and over similar sprockets, not shown, suitably mounted at the free end of the boom made up of the beams 6. The sprocket chains 10 carry scoops or spades 11, which are of the kind that pick up the load at their front edges and discharge the same at their lower edges, the discharge taking place as the buckets or spades make the upward turning movement around the shaft 5 and sprockets 9.

The cleaning device comprises a pair of arms 12 intermediately pivoted on the shaft 5 and provided at their opposite ends with rigidly secured scraper blades 13 that are located diametrically opposite to each other and are so projected from the shaft 5 that the positioned scraper blade will clean the inner surface of the upwardly moving bucket or spade 11.

The drawings show the cleaning device in an operative position, the left-hand scraper blade being positioned for cleaning action while the right-hand scraper blade is stopped against the yielding stop device constructed as follows: A pair of laterally spaced levers 14 are rigidly secured to a rock shaft 15 journaled in the beams 6 The short inner ends of these levers 14 are rigidly connected by a transverse rod 16 that affords a stop against which the inactive scraper blade 13 will be normally stopped when the other scraper blade is in operative or active position. The long outer ends of the levers 14 are yieldingly held normally against the crossed bar 7, by coiled springs 17, which, as shown, are adjustably anchored by nut-equipped eye bolts 18 to a transverse bar 19 extending between and secured to the beams 6.

By reference particularly to Fig. 1, it will be noted that the stop rod 16 engages the inactive scraper blade 13 close to the outer edge of the latter. The tension spring 17 is such that the yielding stop device described will hold the scraper or cleaning device in working position with sufficient force to clean the buckets or spades of dirt or even heavy clay, but with less force than that which would be liable to break any of the parts of the machine if, in fact, a rock or the like should be caught between the bucket and the operative scraper blade. Hence, it, of course, follows that in case a rock or the like should be caught between the bucket and the operative scraper blade, the force then produced would overcome the springs 17, move the levers 14 and depress the stop rod 16, causing the same to move on the arc of one circle while the engaged edge of the scraper blade moves on the arc of another circle to a place where the two arcs separate and said scraper blade passes free from said stop rod. When this releasing action takes place, the cleaner or scraping device will rotate freely through one hundred and eighty degrees or until the previously operative scraper blade is engaged with the stop rod 16 and the released scraper blade has assumed an active or operative position. Of course, the stop device, including the levers 14 and lever 16, will be immediately restored to position by the springs 17 as soon as said rod is released from the scraper blade as just above described.

The cleaning device or scraper above described is highly efficient for the purposes for which it is designed, is strong and durable and of comparatively small cost.

It is important to note that the scraper-equipped cleaning device rotates around the axis of the shaft 5 and that the stop device, which is carried by the beams 6 of the excavator boom, are also pivoted for movements around the axis of said shaft so that the stop device and cleaning device maintain a constant relation in all vertical adjustments of the boom.

What I claim is:

1. In an excavating mechanism, the combination with a bucket-equipped excavator belt, of a rotary bucket-cleaning device having diametrically opposite scraper blades adapted to be operatively positioned in succession, and a yielding stop normally operative on the inactive scraper portion of said cleaning device and adapted to yield and clear the same under excessive pressure.

2. In an excavating mechanism, the combination with a bucket-equipped excavator belt, of a rotary bucket-cleaning device having diametrically opposite scraper blades, adapted to be operatively positioned in succession, and a yielding stop normally operative on the inactive scraper portion of said cleaning device and adapted to yield and clear the same under excessive pressure.

3. In an excavating mechanism, the combination with a shaft having laterally spaced sprockets, and bucket-equipped belts running over said sprockets, of a cleaning device rotatably mounted on said shaft and having diametrically opposite scraper blades, and a yielding stop directly engageable with said cleaning device at the inactive scraper-equipped portion thereof and adapted to yield and clear the same under excessive pressure.

4. In an excavating mechanism, the combination with a shaft having laterally spaced sprockets, and bucket-equipped belts running over said sprockets, of a cleaning device rotatably mounted on said shaft and having diametrically opposite scraper blades, and a stop device comprising a pair of laterally spaced yieldingly pressed levers and a stop bar connecting said levers, said stop bar normally engaging the inactive scraper-equipped portion of said cleaning device but adapted to yield and clear the same under excessive strain.

5. In an excavating mechanism, the combination with a shaft having laterally spaced sprockets, and bucket-equipped belts running over said sprockets, of a cleaning device rotatably mounted on said shaft and having diametrically opposite scraper blades, and a stop device comprising a pair of laterally spaced levers, a stop bar rigidly connected to said levers and engaging the inactive scraper of said cleaning device, and anchored springs connected to said levers.

6. In an excavating mechanism, the combination with a framework and a horizontal shaft journaled thereto, of a boom comprising laterally spaced beams and a cross-connecting bar, said beams being pivoted for movement around the axis of said shaft, sprockets carried by said shaft between the beams of said boom, bucket-equipped belts running over said sprockets, a pair of arms pivoted on said shaft between said sprockets and having diametrically opposite scraper blades movable successively to operative positions, and a stop device comprising a pair of laterally spaced spring-pressed levers, and a stop rod rigidly connecting said levers, said stop rod normally engaging the inactive scraper blade but adapted to yield and clear the same under excessive strain.

In testimony whereof I affix my signature.

GEORGE H. GREIMAN.